United States Patent Office 3,163,556
Patented Dec. 29, 1964

3,163,556
PROCESS FOR THE PREVENTION OF ELECTROSTATIC CHARGES
Herbert Frotscher, Dusseldorf-Benrath, Germany, assignor to Bohme Fettchemie G.m.b.H., Dusseldorf, Germany, a corporation of Germany
No Drawing. Filed Jan. 13, 1960, Ser. No. 2,103
Claims priority, application Germany Jan. 15, 1959
9 Claims. (Cl. 117—138.8)

This invention relates to a method for preventing formation and accumulation of static electricity on synthetic textiles and other shaped synthetic materials.

A great variety of agents have already been proposed for use in preventing the formation of electrostatic charge on fibers, flakes, threads, strands, knitted and woven materials, foils and other shaped objects made of polyamides, polyesters, polyvinyl compounds, cellulose acetate, as well as natural or synthetic albuminous materials. These known agents exhibit various effects, but many of them have the disadvantage that they cannot be incorporated into the materials so that they are resistant against removal by washing, which is very unfavorable, especially for textiles which are constantly subjected to washing processes.

It is therefore an object of this invention to provide a method for treating synthetic materials to prevent the formation and accumulation of static electricity thereon.

It is a further object to provide an antistatic treatment for textile materials subject to repeated washing.

Another object is to provide an antistatic treating agent which is not removed from the treated material by repeated washing.

These and other objects of my invention will become apparent as the description proceeds.

A process has been previously discovered for preventing the formation of electrostatic charges on textile materials or other shaped objects made of polyamides, polyesters, polyvinyl compounds or cellulose acetate as well as natural or synthehtic albumin fibers, in which these materials are impregnated with water-soluble or water-dispersible condensation products, formed by amino-triazines or their derivatives with oxo-compounds and polyalkylene oxides, as well as with customary hardening catalysts, if necessary, and are subsequently dried at temperatures between 60 and 150° C., preferably at temperatures above 80° C. This process is described in copending application Serial No. 757,665, filed August 28, 1958, now U.S. Patent No. 2,986,479.

I have now found that in this process the polyalkylene oxides can advantageously be replaced by addition products of alkylene oxides, especially of ethylene oxide, with compounds which contain exchangeable hydrogen atoms which are attached to the molecule through oxygen, sulfur or nitrogen atoms, and/or that the condensation products formed by amino-triazine or their derivatives with oxo compounds can be replaced by condensation products formed by urea and glyoxal and/or their alkylol derivatives.

By using the polyalkoxylation products, anti-statically effective condensation products are obtained which at the same time impart a soft feel to the textiles; the urea-glyoxal condensates also give a smoother finish to the textile than the amino-triazine formaldehyde condensates. The urea-glyoxal condensates are also stable under acid storage conditions.

Examples of suitable alkylene oxide addition products according to the present invention are oxoalkylation products of mono- or polyalcohols, phenols, alkyl phenols, mono- and polyvalent carboxylic acids, mono- or polyvalent polycarboxylic acid amides, mono- or polyvalent alkyl amines, alkylol amines, fatty acid alkylol amides, fatty acid trialkylol amino esters and the like. The hydrocarbon radical of the compounds may belong to the aliphatic, cycloaliphatic or aromatic or fatty aromatic series and should contain about 1 to 30 carbon atoms in the molecule. The amount of alkylene oxide, especially ethylene oxide, which is added should amount to about 3 to 100 mols per 1 mol of compound containing the exchangeable hydrogen atom. More particularly, they are, therefore, addition products of alkylene oxides and fatty alcohols, fatty acids, naphthenic acids, resin acids, di- or polycarboxylic acids, ammonium, mono-, di- and trialkylol amines, glycols, glycerin, pentaerythrite, trimethylol propane, sugar alcohols, alkylene diamines, dialkylene triamines etc.

Examples of products which are formed by the condensation of urea and glyoxal or their alkylol derivatives are the following: methylol compounds of acetylene di-urea, such as tetramethylol glycoluril, methylol compounds of tetrahydroxy bisethylene urea and/or dihydroxyethylene urea and/or reaction products formed by one mol dimethylol urea, 1 mol monomethylol urea and 2 mols glyoxal. It is essentially immaterial in what manner the reaction products of urea and glyoxal and their alkylol derivatives or the corresponding reaction products of alkylol urea and glyoxal are produced.

For example, a suitable compound may be obtained by reacting 1 mol glyoxal, adjusted to a pH of 5 to 7, in 30% aqueous solution with 1 mol urea without supply of heat and subsequent methylolation of the reaction product with at least 2 mols formaldehyde at a pH of 7 to 8. However, equally effective is a product in the production of which the neutralization of the glyoxal solutions was omitted and the subsequent reaction of the reaction product with formaldehyde also takes place in the acid range (pH 2 to 4). An equally effective compound is also obtained from 1 mol dimethylol urea and 1 mol glyoxal, the aqueous solution of which had been adjusted to a pH of 5 to 7.

For a successful textile finishing treatment, it is immaterial whether the above methylol compounds have been reacted with the polyglycols or the above mentioned oxalkylation products by heating to an elevated temperature before their use, or whether they are added to the impregnation baths together with polyglycol and/or the polyglycol derivatives, so that the reaction does not take place by the components until the mixture is heated on the fiber.

The components may also be admixed with each other at room or slightly elevated temperature, so that if a varying quantity of water is used as the solvent, it is possible to produce liquid or paste-like products in a very simple manner.

Since the methylolation products of the compounds formed by urea and glyoxal or the reaction products formed by methylol urea and glyoxal are very stable in acid solution, it is possible to add the acid catalysts required for the hardening directly to the finished product.

It should be added that the methylolation of the urea-glyoxal reaction products with more than the theoretical amount of formaldehyde sometimes leads to an increase in the stability of the antistatic finish.

The following examples are set forth to enable persons skilled in the art to better understand and practice my invention and are not intended to be limitative.

*Example I*

In a vessel provided with a stirring device 600 parts by weight of a 30% aqueous solution of formaldehyde (6 mols) were admixed with 400 parts by weight water. This mixture was then adjusted to a pH of 7.5 to 8 with dilute aqueous sodium hydroxide. Thereafter, 126.5 parts by weight (1 mol) of melamine were added. The mixture was heated to a temperature of 80 to 85° C., whereby the melamine dissolved. The temperature was maintained for 10 minutes at 80 to 85° C. Then 1580 parts by weight of an oxethylation product of tallow alcohol which contained about 30 ethylene oxide groups per molecule (1 mol) was stirred into the mixture in the molten state. The total mixture was then stirred for 30 minutes at about 90° C. Thereafter, the temperature was raised to 95° C. and, while vigorously stirring, 3000 parts by weight of water at 95° C. were rapidly added. The thick liquid product thus obtained was then cooled, while continuing stirring, to about 50° C., and the pH was adjusted to 7 to 7.5 with a small amount of sodium hydroxide. A jel-like clear paste was obtained.

A polyester fabric was treated on a padding machine with a solution containing 100 gm. per liter of the product obtained above and 5 gm. per liter crystalline aluminum chloride, squeeze-dried to about 50% solution-absorption and then dried at 90° C. to 100° C. on a stretching frame. The fabric thus treated had a soft feel and, even after 10 washings at 40 to 70° C. with any desired washing agent, did not exhibit any permanent electrostatic charge.

*Example II*

A polyacrylic nitrile fabric was treated in a padding machine with an aqueous solution of a product which had been produced analogous to Example 1, but in which the oxethylated tallow alcohol was replaced by an equivalent amount of an oxalkylation product of a fatty acid, an alkylamine or a fatty acid amide containing about 20 ethylene oxide groups in the molecule; the solution also contained 10 gm. crystalline magnesium chloride. The fabric was dried at 120 to 140° C. Even after repeated washing with any desired washing agent solution the fabric exhibits excellent antistatic properties.

*Example III*

375 parts by weight polyglycol having an average molecular weight of 1000 (0.357 mol) and 400 parts by weight of an octylphenol polyglycol ether having an average molecular weight of 1600 (0.25 mol) in the molten state were added to 2550 parts by weight of water at a temperature of about 90° C. 62 parts by weight melamine (0.5 mol) and 150 parts by weight of a 30% aqueous formaldehyde solution were stirred into the mixture. The pH of the mixture was adjusted to between 7.5 and 8 with sodium hydroxide and the temperature was maintained at 85 to 87° C. for 10 to 15 minutes. Thereafter, while stirring, the mixture was cooled to about 50° C.

A polyamide fabric was treated with an aqueous solution containing 100 gm. per liter of the above product and 4 gm. per liter ammonium nitrate, squeeze-dried to about 60% solution absorption and dried at a temperature of 80 to 100° C.; the fabric thus treated did not develop any electric charge upon being rubbed. The antistatic properties of this fabric withstood several washings with any desired washing agent.

*Example IV*

6 mols of a 30% aqueous solution of formaldehyde and 1 mol melamine were added to 1 mol of a molten oxethylation product of adipic acid diamide having an average molecular weight of 1600 accompanied by stirring. The mixture thus obtained was adjusted with sodium hydroxide to a pH of 7.5 to 8. Thereafter, the mixture was heated as rapidly as possible to 120° C. while distilling off the water. When a turbidity formed the reaction mixture was cooled to 90° C. and, while stirring, 780 gm. cold water were added. A viscous liquid was obtained which was miscible with water in any desired ratio.

A polyester fabric impregnated in a padding machine with a solution containing 50 gm. per liter of this product and 5 gm. per liter crystalline aluminum chloride and thereafter dried at elevated temperature, exhibited good antistatic properties even after repeated and frequent washings.

*Example V*

3 kg. of an oxethylation product of glycerin having an average molecular weight of about 900, 1 kg. tetramethylol melamine (100%) and 500 gm. crystalline aluminum chloride were successively dissolved in 100 liters of cold water. A polyacrylic nitrile fabric was impregnated in a padding machine with this solution and was squeeze-dried to about 50% solution absorption. Thereafter, the fabric was dried at 90 to 110° C. in the usual manner on a stretching frame. After 10 washings at 60° C. with any desired washing agent, the treated fabric exhibited about $10^3$ to $10^4$ less electrical resistance than the untreated fabric. The same result was obtained when, in place of the oxethylation product of glycerin, about the same amount of an oxethylation product of triethanolamine or of trimethylolpropane or of diethylene triamine having a similar molecular weight or a polyglycol with an average molecular weight of 600 to 1000 was used.

*Example VI*

A polyester fabric was treated in the usual manner with a solution containing 50 gm. per liter of a product analogous to that described in Example 3 and 4 gm. per liter ammonium nitrate. The product used in this run differed from that produced in Example 3 merely in that 0.4 mol of an octylphenol polyglycol ether with about 6 ethylene oxide groups in the molecule was used in place of the octyl phenol polyglycol ether having a molecular weight of 1600. This treatment also resulted in a textile material having a wash resistant antistatic property.

*Example VII*

35 parts by weight acetylene diurea (glycoluril), obtained in known fashion by reaction of urea with glyoxal in an acid medium were dissolved in 110 parts by weight of 30% aqueous solution of formaldehyde. The resulting solution was adjusted to a pH of 7.5 to 8 with aqueous sodium hydroxide. The mixture was heated for 10 minutes at 80° C. while stirring. Thereafter, 225 parts by weight polyglycol (average molecular weight 1500) were stirred in, 40 parts by weight cold water were added and the mixture was stirred until cold. 450 parts by weight of a clear liquid were obtained.

A polyacrylic nitrile fabric was treated with a solution containing 50 gm. per liter of the product obtained above and 5 gm. per liter ammonium nitrate, squeeze dried and dried at 110 to 130° C. for 1 to 2 minutes. The fabric treated in this manner had a soft feel and did not develop any electrostatic charge even after numerous washings with a customary household washing agent.

*Example VIII*

194 parts by weight of a 30% solution of glyoxal (1 mol) were placed into an open flask provided with a stirring device and the pH was adjusted to 6.5 with about 7 parts by weight anhydrous sodium carbonate, while stirring. Thereafter, a solution of 30 parts by weight urea (0.5 mol) in 35 parts water was added. This mixture was stirred for 1 hour, whereby the temperature rose to 30 to 32° C. without addition of heat. To this solution 750 parts by weight molten polyglycol (molecular weight 1500) and 235 parts by weight water were added. About 1250 parts by weight of a liquid product were obtained. A polyester fabric treated with a solution containing 50 gm. per liter of this product in the presence of 10 gm. per liter ammonium nitrate and dried for 5 minutes at 140° C. exhibited good antistatic properties which remained even after several washings.

*Example IX*

4.4 kg. of a 30% aqueous formaldehyde solution were placed into an enamel-lined 50-liter vessel provided with a stirring device and the pH was adjusted to between 8 and 8.5 with aqueous sodium hydroxide. Thereafter, 1.2 kg. urea were dissolved therein by stirring; the temperature of the contents of the vessel dropped to about 12° C. The mixture was then stirred for about 2 hours without the addition of heat; the temperature again rose slowly to 35 to 38° C. during thhat time. A higher temperature was avoided by external cooling if necessary. 3.87 kg. of a 30% glyoxal solution which had been adjusted to a pH of 5 with calcined soad were then added. The mixture was stirred without external heat supply for about 2 hours whereby the temperature rose to about 40 to 42° C. A greater rise in temperature was prevented by external cooling. 18 kg. molten polyglycol (1500) were then stirred in the resulting reaction mixture and the mixture was cooled by stirring to about 30° C. Finally, 8 kg. of a 45% ammonium nitrate solution was stirred in. About 35 kg. of a faintly yellow liquid product were obtained. A polyester fabric was treated in a padding machine with a solution containing 50 mg. per liter of the above product, squeeze dried to about 50% liquid absorption and dried at 120° C. for 1 to 2 minutes. The fabric thus treated exhibited excellent antistatic properties.

For the treatment of a polyamide fabric a solution containing 60 to 70 gm. per liter of the same product and 3 to 5 gm. per liter of ammonium nitrate is used.

*Example X*

193.5 parts by weight of a 30% aqueous technical grade glyoxal solution (1 mol) were placed into a vessel provided with a stirring device and the pH value of the solution was adjusted to between 3.5 and 5 with aqueous sodium hydroxide. Thereafter, while vigorously stirring, 60 parts by weight urea (1 mol) were added as rapidly as possible, whereby the temperature dropped sharply. When all of the urea had dissolved the mixture was stirred for 3 hours. During this time the temperature rose to from 37 to 40° C. without external heat supply. Thereafter, the reaction mixture was cooled to about 20° C. 220 parts by weight of a 30% aqueous formaldehyde solution (2.2 mols) were added, the pH of the resulting mixture was adjusted to between 7.5 and 8 with aqueous sodium hydroxide and the mixture was stirred without external heat supply for about 2½ hours. 900 parts by weight polyglycol 600 (1.5 mols) and about 100 parts by weight water were stirred into the resulting reaction product. About 1500 parts of a liquid product were obtained.

A polyacrylic nitrile fabric was impregnated with an aqueous solution containing 40 gm. per liter of this product and 5 gm. per liter ammonium nitrate, squeeze dried to about 60% liquid absorption and dried at 120 to 140° C. for a 1 to 2 minutes. The fabric washed 10 times at 50 to 60° C. with any desired washing agent solution exhibited a resistance which was $10^3$ to $10^4$ times lower than that of the untreated fabric. An electrostatic charge created on the fabric by vigorous rubbing disappeared within a fraction of a second.

*Example XI*

Perlon carpet yarn was treated with an aqueous solution containing 60 to 80 gm. per liter of the product produced in Example IX and 3 to 5 gm. per liter ammonium nitrate, allowed to drip-dry, centrifuged to a liquid absorption of about 40% and thoroughly dried at 80 to 100° C. A carpet produced from this yarn did not develop any electrostatic charge even after repeated dry cleaning or after repeated surface cleaning by the foam process.

The impregnation bath was storage stable for virtually unlimited periods of time, so that a large quantity of yarn could be treated with the same bath and possibly by re-use of the impregnation solution obtained from the centrifuging step.

*Example XII*

97 parts by weight of a technical grade acid 30% aqueous glyoxal (0.5 mol) solution were placed into a vessel provided with a stirring device and 30 parts by weight urea (0.5 mol) were stirred in. After first dropping, the temperature of the reaction mixture rose without external heat supply and was maintained at a temperature between 30 and 45° C. by slight cooling, if necessary. After all of the urea had completely dissolved the mixture was stirred for about 2 hours. Thereafter, 110 parts by weight of a 30% aqueous formaldehyde solution (1.1 mols) were added, the mixture was stirred for 2 hours and then 250 parts by weight water were added.

3 kg. of an oxethylation product obtained by reaction of a fatty alcohol with 16 to 18 carbon atoms in the molecule and 30 mols ethylene oxide, 1 kg. of the product described in the first part of this example, 200 gm. of a 30% formaldehyde solution and 500 gm. ammonium nitrate were successively dissolved in 100 liter of water. A polyester fabric was impregnated with this solution in a padding machine, squeeze dried to about 50% liquid absorption and dried at 110 to 140° C. for 1 to 4 minutes. The finished fabric had a soft, full feel and did not develop any electrostatic charge even after several washings.

*Example XIII*

A polyacrylic nitrile fabric was impregnated with an aqueous solution containing 40 gm. per liter of the product obtained in Example IX and 5 to 10 gm. per liter of a softener of the non-ionic, anionic or cationic type. Thereafter, the fabric was squeeze-dried to a solution absorption of 50 to 60% and dried in customary fashion at elevated temperature. In addition to antistatic properties, the finished fabric had a particularly pleasant, soft feel. The character of the feel may be varied within wide limits by the type and quantity of the softener which is employed without adversely affecting the washing resistance of the antistatic finish.

*Example XIV*

150 parts by weight of a 30% aqueous formaldehyde solution (1.5 mols) were placed into a vessel provided with a stirring device and the pH was adjusted to between 7.5 and 8 with aqueous sodium hydroxide. Thereafter, 60 parts by weight urea (1 mol) were introduced by stirring and, without any external heat supply the resulting mixture was stirred until the urea-formaldehyde solution began to cloud up. 193.5 parts by weight of a 30% aqueous glyoxal solution (1 mol) which had been adjusted to a pH of 6 with sodium carbonate were added. The reaction mixture was heated to 70° C. and maintained at this temperature for 5 minutes. Thereafter, while continuously stirring, 1500 parts by weight polyglycol 1500 (1 mol) were added and the temperature was increased to 120 to 125° C. as rapidly as possible while the water was distilled off. The reaction mixture was maintained at this temperature until a resinous substance began to separate out on the wall of the vessel. The reaction mixture was then rapidly cooled to 90° C. and 600 parts by weight cold water were added.

A polyester fabric was treated with a solution containing 50 gm. per liter of this product and 5 gm. per liter ammonium nitrate in a padding machine, squeeze-dried to about 50% solution absorption and dried at 100 to 120° C. for about 2 to 4 minutes. The fabric treated in this manner did not develop any electrostatic charge even after numerous household washings.

*Example XV*

A mixed fabric of 50% wool and 50% polyester fibers was acidified with a solution containing 2 gm. per liter hydrochloric acid, rinsed and dried. Subsequently, this fabric was impregnated in a padding machine with a solution containing 60 to 80 gm. per liter of the product described in Example IX and 5 gm. per liter ammonium nitrate, squeeze-dried and then dried at elevated temperatures. In relation to the untreated fabric the fabric treated in this manner was characterized by having a low soil affinity even after several washings.

A mixed fabric consisting of 67% polyester fibers and 33% cotton was impregnated in a padding machine with an aqueous solution containing 100 gm. per liter of the product described in Example IX, squeeze-dried and dried at elevated temperatures. The fabric treated in this manner had less affinity for soil than a corresponding untreated fabric.

While I have set forth specific embodiments and preferred modes of operation of my invention, it will be understood that various modifications and changes may be made thereto without departing from the spirit of the disclosure or the scope of the appended claims.

I claim:

1. A process for preventing the formation and accumulation of electrostatic charges on synthetic materials subject to such charges which comprises impregnating said materials with an aqueous dispersion of at least one condensation product selected from the group consisting of (1) condensation product of (a) melamine, with (b) formaldehyde, and with (c) alkyleneoxide addition products of compounds selected from the group consisting of phenols, fatty alcohols, fatty acids, fatty acid amides, alkylamines and alkylolamines, said compounds containing from 1 to 30 carbon atoms and said alkylene oxide moiety having alkyl groups with two to three carbon atoms; (2) condensation product of (a) urea, with (b) glyoxal, and with (c) polyalkylene oxides having alkyl groups with two to three carbon atoms; and (3) condensation product of (a) urea, with (b) glyoxal, and with (c) alkylene oxide addition products of compounds selected from the group consisting of phenols, fatty alcohols, fatty acids, fatty acid amides, alkylamines and alkylolamines, said compounds containing from 1 to 30 carbon atoms, and subsequently drying said materials at a temperature of 60 to 150° C.

2. The process of claim 1 wherein drying of said treated materials is carried out at a temperature from about 80 to 150° C.

3. The process of claim 1 wherein hardening catalysts are used.

4. A process for preventing the formation and accumulation of electrostatic charges on synthetic materials subject to such charges which comprises impregnating said materials with an aqueous suspension of a condensation product of (a) melamine, with (b) formaldehyde, and with (c) oxyethylated compounds selected from the group consisting of phenols, fatty alcohols, fatty acids, fatty acid amides, alkylamines, and alkylolamines having from 1 to 30 carbon atoms, and subsequently drying said materials at a temperature of 60 to 150° C.

5. A process for preventing the formation and accumulation of electrostatic charges on synthetic materials subject to such charges which comprises impregnating said materials with an aqueous suspension of a condensation product of (a) melamine, with (b) formaldehyde, and with (c) oxyethylated compounds selected from the group consisting of phenols, fatty alcohols, fatty acids, fatty acid amides, alkylamines and alkylolamines having from 1 to 30 carbon atoms, in the presence of ammonium nitrate and subsequently drying said materials at a temperature of 60 to 150° C.

6. A process for preventing the formation and accumulation of electrostatic charges on synthetic materials subject to such charges which comprises impregnating said materials with an aqueous suspension of (1) condensation product of (a) urea, with (b) glyoxal, and with (c) formaldehyde and with (2) a polyglycol and subsequently drying said materials at a temperature of 60 to 150° C.

7. A process for preventing the formation and accumulation of electrostatic charges on synthetic materials subject to such charges which comprises impregnating said materials with an aqueous suspension of (1) condensation product of (a) urea, with (b) glyoxal, and with (c) formaldehyde, and with (2) a polyglycol, in the presence of ammonium nitrate, and subsequently drying said materials at a temperature of 60 to 150° C.

8. A process for preventing the formation and accumulation of electrostatic charges on synthetic materials subject to such charges which comprises impregnating said materials with an aqueous suspension of condensation product of (a) glyoxal, with (b) formaldehyde, and with (c) a polyglycol, and subsequently drying said materials at a temperature of 60 to 150° C.

9. A process for preventing the formation and accumulation of electrostatic charges on synthetic materials subject to such charges which comprises impregnating said materials with an aqueous suspension of (1) condensation product of (a) formaldehyde, with (b) urea, and with (c) glyoxal and with (2) oxyethylated fatty alcohols, and drying said materials at a temperature of 60 to 150° C.

References Cited in the file of this patent
UNITED STATES PATENTS

| | | |
|---|---|---|
| 2,574,114 | Lehmann et al. | Nov. 6, 1951 |
| 2,764,573 | Reibnitz et al. | Sept. 25, 1956 |
| 2,876,062 | Torke et al. | Mar. 3, 1959 |
| 2,901,463 | Hurwitz | Aug. 25, 1959 |
| 2,915,502 | Albrecht et al. | Dec. 1, 1959 |
| 2,986,479 | Markert et al. | May 30, 1961 |